United States Patent [19]

Haseley et al.

[11] Patent Number: 5,226,630
[45] Date of Patent: Jul. 13, 1993

[54] VALVE DISC AND DRIVE SHAFT ASSEMBLY

[75] Inventors: Phillip J. Haseley, Newport; Michael P. Morris, Birmingham, both of England

[73] Assignee: BTR plc, United Kingdom

[21] Appl. No.: 826,431

[22] Filed: Jan. 27, 1992

[30] Foreign Application Priority Data

Jan. 30, 1991 [GB] United Kingdom ............... 9102003

[51] Int. Cl.⁵ .................................................. F16K 1/22
[52] U.S. Cl. ...................................... 251/305; 251/86
[58] Field of Search ................. 251/84, 86, 305, 308

[56] References Cited

U.S. PATENT DOCUMENTS

| | | |
|---|---|---|
| 3,118,465 | 1/1964 | Scaramucci . |
| 3,192,945 | 7/1965 | Blakely .......................... 251/84 X |
| 3,341,170 | 9/1967 | Housworth . |
| 4,293,163 | 10/1981 | Braddick . |
| 4,519,414 | 5/1985 | Anaya ........................... 251/309 X |
| 4,756,507 | 7/1988 | McAndrew . |

FOREIGN PATENT DOCUMENTS

| | | |
|---|---|---|
| 209123 | 5/1960 | Austria . |
| 1072037 | 12/1959 | Fed. Rep. of Germany ......... 251/84 |
| 2648520 | 5/1978 | Fed. Rep. of Germany ...... 251/308 |
| 2724007 | 12/1978 | Fed. Rep. of Germany ...... 251/308 |
| 1464861 | 11/1966 | France . |
| 2105011 | 3/1983 | United Kingdom . |

Primary Examiner—John C. Fox
Attorney, Agent, or Firm—Stevens, Davis, Miller & Mosher

[57] ABSTRACT

A valve disc and drive shaft assembly wherein the end of the drive shaft seats in a blind bore at the periphery of the valve disc. The end of the shaft or the base of the bore is formed with a tang, extending perpendicularly to the plane of the disc, seating in an elongated recess in the base of the bore or end of the shaft respectively.

8 Claims, 5 Drawing Sheets

VALVE DISC AND DRIVE SHAFT ASSEMBLY

BACKGROUND OF THE INVENTION

This invention relates to a valve disc and drive shaft assembly particularly for a butterfly valve.

In a known form of butterfly valve, the disc is cast to its general shape and then a diametrically arranged bore is formed by drilling. This bore extends across the whole diameter of the disc and receives the drive shaft by means of which the disc is rotated to open or close the valve. To prevent the shaft rotating in the bore one or more pins are provided radially with respect to the shaft axis and inserted through holes in the disc into blind apertures on the shaft.

However, it has been found that sometimes the joint between a pin and a disc is not properly formed or becomes damaged and leakage occurs either through the disc from one side to the other, or from the interior to the exterior of the valve along a leakage path alongside the drive shaft.

When in the closed condition the disc of a butterfly valve disc is often subjected to a considerable pressure caused by the fluid acting on one side. As a result the disc may bend and very high bending movements are applied to the shaft. To open the valve a large torque has to be applied to the shaft and additionally in order to support these loads the shaft has to be of relatively large diameter.

SUMMARY OF THE INVENTION

It is an object of the present invention to provide a valve disc and drive shaft assembly with a relatively simple means for non-rotatably securing the disc to the shaft and to reduce or overcome the above disadvantages.

In accordance with the present invention, a valve disc and drive shaft assembly comprises a disc formed with a blind bore of circular cross-section extending radially inwards from the disc periphery and a shaft of circular cross-section located in said bore having a diameter substantially equal to that of the bore, the end of the shaft or the base of the bore being provided with a tang extending parallel to the shaft rotational axis and diametrically across at least part of the shaft or base perpendicularly to the plane of the disc and fitting in a corresponding recess provided at the base of the bore or the end of the shaft respectively.

Preferably the tang and recess are generally rectangular, preferably with rounded ends, for ease of manufacture. The tang may be formed integrally with or separately from the shaft or base and be an interference fit in an aperture formed in the base of the bore or end of the shaft respectively.

BRIEF DESCRIPTION OF THE DRAWINGS

One embodiment of the invention will now be described by way of example with reference to the accompanying drawings of which.

DETAILED DESCRIPTION OF A PREFERRED EMBODIMENT

Figure 1:
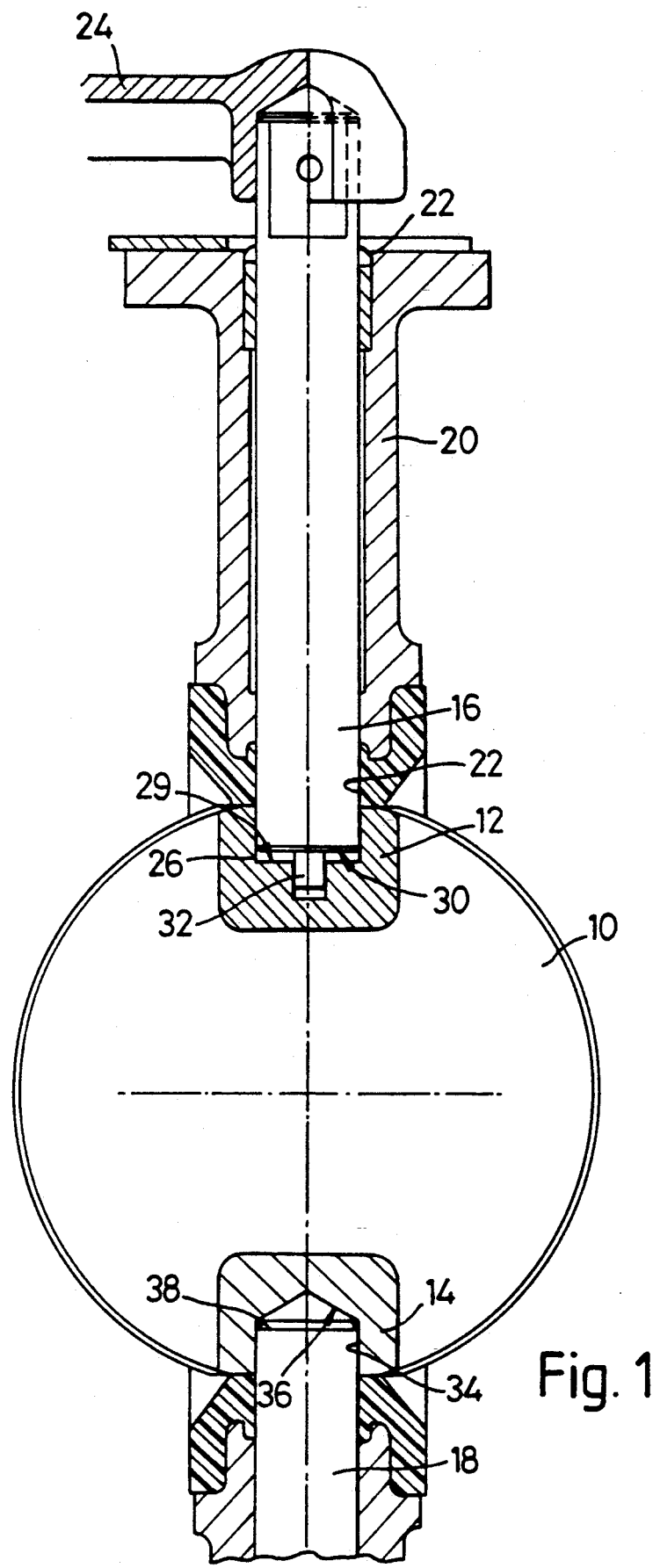
FIG. 1 is a general cross-sectional view of the valve disc and drive shaft assembly and associated valve components.
Figure 2:
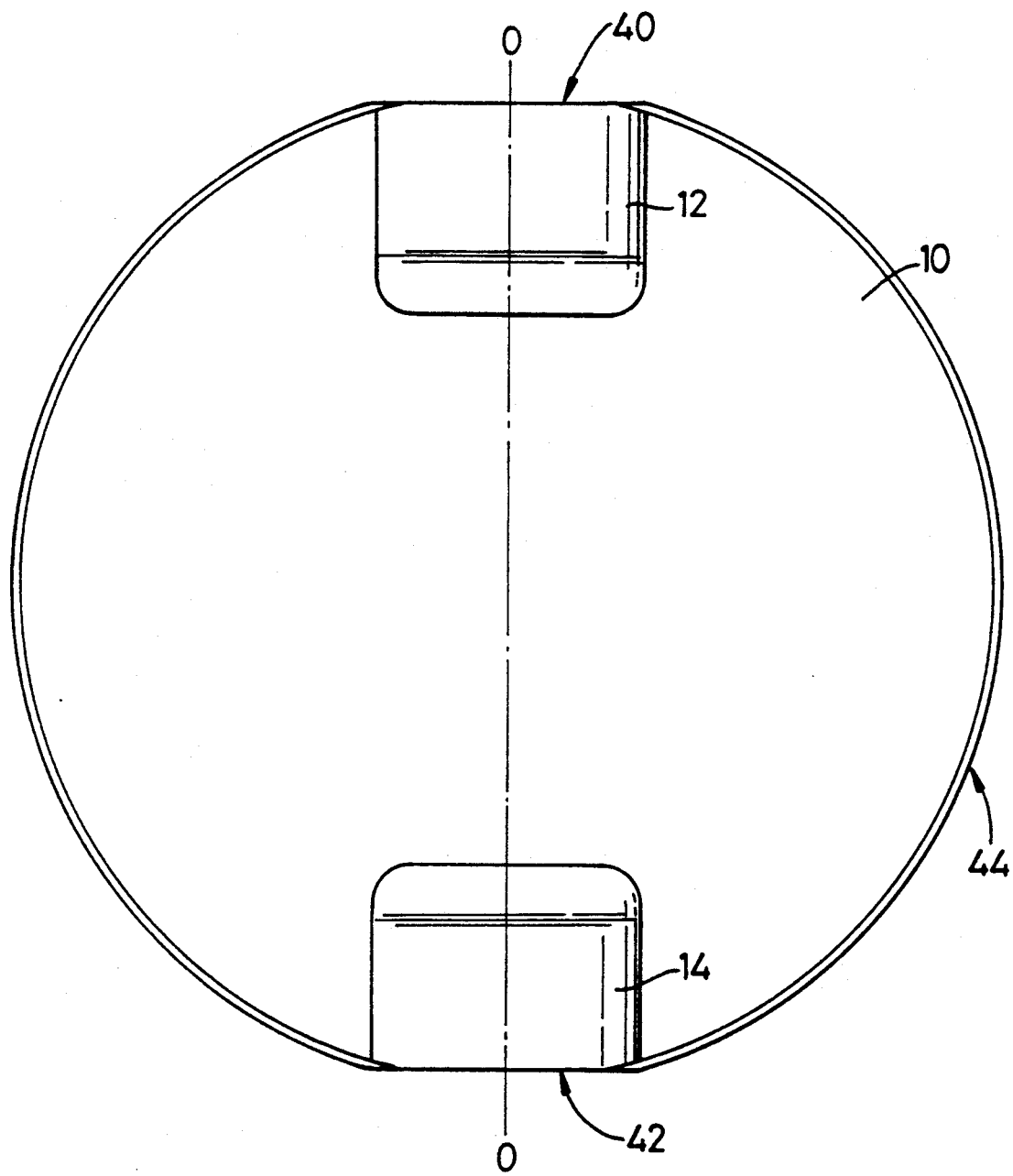
FIG. 2 is a side view of the valve disc.

As can be seen in the drawings the valve comprises a central valve disc 10, an upper socket 12 and a lower socket 14, all cast as a single unit and then subsequently machined to its final shape, an upper drive shaft 16 and a lower supporting shaft 18.

The upper drive shaft 16 is housed in a conventional tubular housing 20 in the body of the valve and is provided with a seal 22 in a conventional manner. Details of this will not be given because they are not relevant to the present invention. A handle 24 is provided at the upper end of the drive shaft 16 in order that the valve may be opened and closed.

Figure 6:
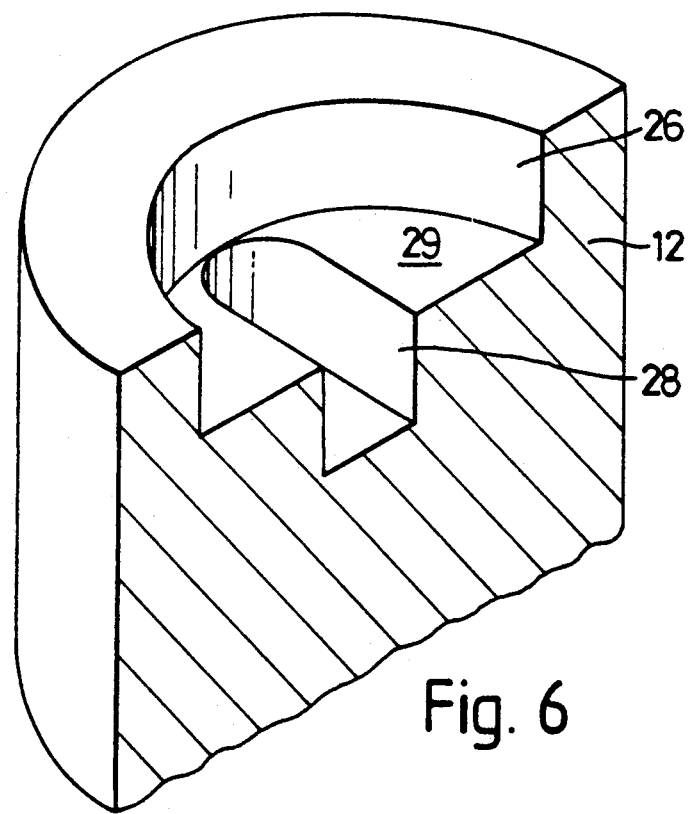
FIG. 6 is a perspective view of half of the upper socket of the valve disc.

The upper socket 12 of the valve disc 10, shown particularly in FIG. 6, is provided with a shallow main bore 26, accurately machined to the required size and shape and, in the base 29 of the main bore, an elongated recess 28 extending diametrically across the whole of the base of the main bore, the longer axis of the recess being perpendicular to the central plane of the disc. The recess 28 is generally rectangular in plan but with semicircular ends.

The end 30 of the drive shaft 16 is accurately machined so that it is generally at right angles to the shaft axis 0—0 and it locates in the main bore 26 of the upper socket 12 so that the shaft axis 0—0 is in alignment with the axis of the main bore. Protruding from the end of the shaft is a tang 32 having a configuration corresponding to the recess 28 at the base 29 of the main bore 26 in the upper socket 12. This tang 32 is a tight sliding fit in the recess 28, the longer axis of the tang (i.e. the tang dimension measured perpendicularly to the plane of the disc) being slightly shorter than the longer axis of the recess.

Diametrically opposite the upper socket 12 of the valve disc 10 is a lower socket 14 formed with a shallow bore 34 and having a conical base 36 formed by a drilling operation. This bore 34 formed in the lower socket receives the upper end 38 of the lower supporting shaft 18. The lower supporting shaft 18 and the lower socket act as a bearing for the valve disc. The bore 34 in the lower socket 14 and the upper end of the supporting shaft 18 accurately locate the valve disc 10 in the required position in the valve.

Figure 3:
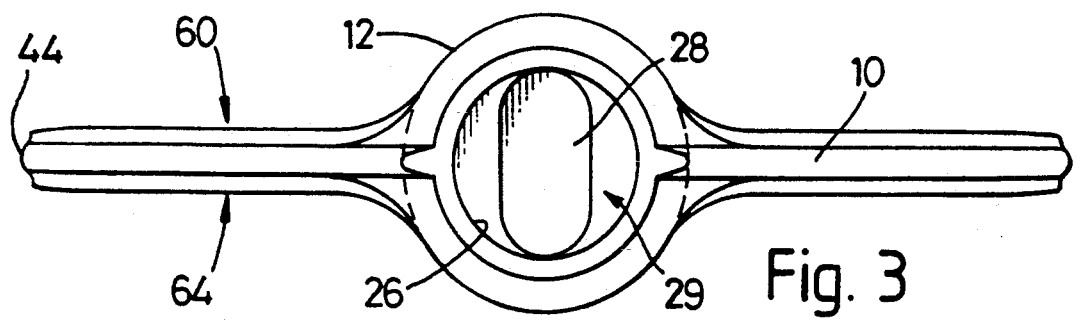
FIG. 3 is a plan view of the valve disc shown in FIG. 2.
Figure 4:
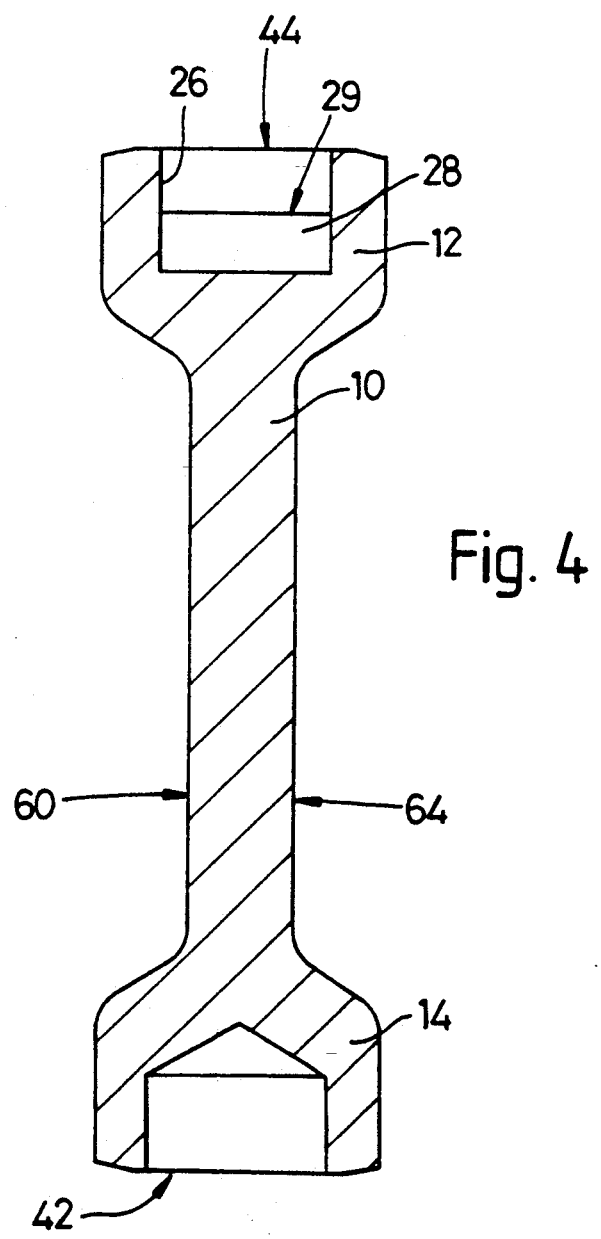
FIG. 4 is a cross-sectional view of the valve disc shown in FIG. 2.
Figure 5:
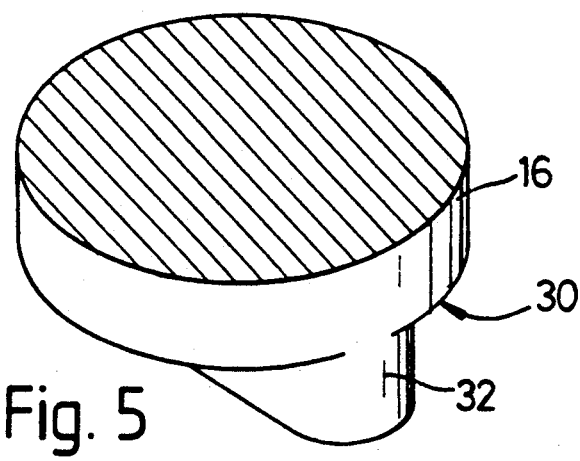
FIG. 5 is a perspective view of the lower end of the drive shaft.

Adjacent the upper and lower sockets the periphery of the valve disc is formed with two flat surfaces 40, 42 in a conventional manner and the two generally semi-circular parts of the periphery of the valve disc are machined to have a profiled edge (generally semi-circular in cross-section) as shown particularly at 44 in FIG. 3 to provide sealing engagement with a rubber seal formed within the bore of the main valve (not shown).

As a first modification to the present invention (not illustrated) the tang on the end face of the drive shaft is not integrally formed therewith but is in the form of a separate member which is an interference fit in an appropriately shaped aperture formed in the end face of the shaft.

Since the major axis of the tang is slightly shorter than the major axis of the recess, when the disc is subjected to a high pressure and caused to bend the tang has freedom to move slightly with respect to the recess. The disc is therefore not constrained by the shaft in the bending mode. Thus a lower torque is needed to rotate the shaft and thus open the valve. If the shaft is operated by an actuator, the size of actuator may be reduced. In addition the diameter of the shaft may also be reduced because less shaft strength is required. Thus overall there may be a saving in energy and material cost.

Figure 7:
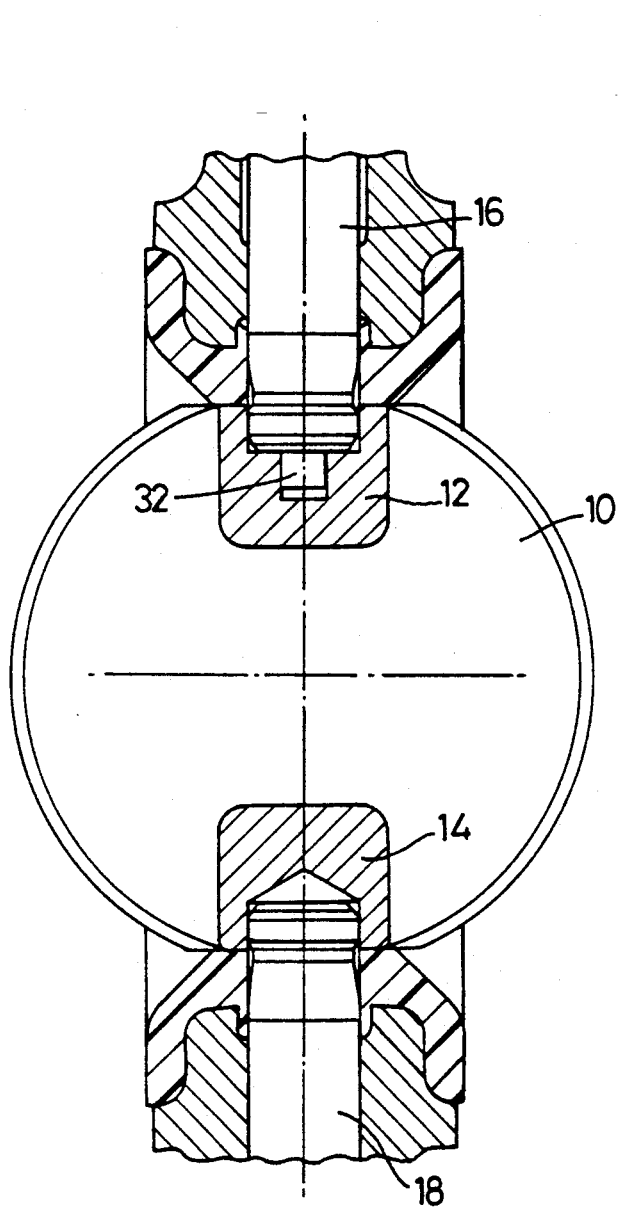
FIG. 7 shows a modified form of the assembly shown in FIG. 1.
Figure 8:
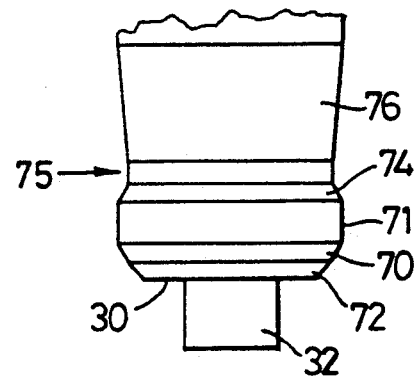
FIG. 8 shows on an enlarged scale the end of the drive shaft.
Figure 9:
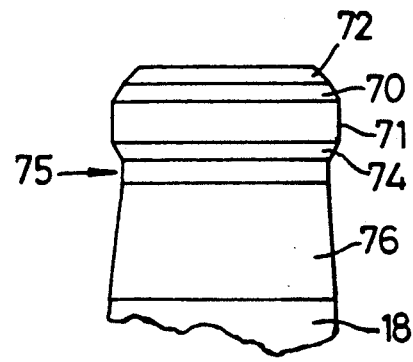
FIG. 9 shows on an enlarged scale the end of the supporting shaft.

In a second modification of the invention shown in FIGS. 7, 8 and 9 the two shafts 16 and 18 are shaped so as to provide shortened lengths 71 of shaft surface engaging the interior surfaces of the bores 26 and 34. This is achieved by providing two frusto conical surfaces 70, 72 immediately adjacent the ends of the shafts, and spaced apart from these a groove 75 having tapered sides 74 and 76, the side 76 further from the shaft end making only a small angle, about 5°, with the shaft axis.

The shortened lengths 71 allows the disc to deflect (or float) between the shafts 16 and 18 when under a pressure load, without constraint by the shafts 16 and 18 to disc bending. Consequently, this keeps any increase in the effort required to rotate the shaft to a low value because the bending movement on each shaft itself has a low value.

Since the valve disc in all forms of the invention is not pierced in any way on either of its main surfaces 60, 64 the likelihood of any leakage occurring from one side of the disc to the other or to the the exterior of the valve along the surface of the drive shaft 16 is eliminated. The tang is aligned as described so that deflection of the disc, when in the closed position, due to the forces of the fluid flowing through the valve, tends to move along the tang and reduce the sideways loading on the shaft, which in turn prevents an excessive increase in the effort required to rotate the shaft.

What I claim is:

1. A valve disc and drive shaft assembly comprising a disc formed with a blind bore of circular cross-section extending radially inwards from the disc periphery and a shaft of circular cross-section located in said bore having a diameter substantially equal to that of the bore, the end of the shaft or the base of the bore being provided with a tang, having a plane which extends parallel to the shaft rotational axis and diametrically across at least part of the shaft or base so as to be perpendicular to the plane of the disc, the tang fitting in an elongated recess provided at the base of the bore or the end of the shaft respectively the tang and the recess each having a major axis length which is measured with respect to the rotational axis of the disc and which extends perpendicularly to the plane of the disc, the major axis length of the tang being less than the major axis length of the recess whereby relative movement may occur between the tang and the recess when an elevated pressure is applied to the disc.

2. An assembly according to claim 1 wherein the tang and recess are generally rectangular.

3. An assembly according to claim 1 wherein the tang and recess are generally rectangular and have rounded ends.

4. An assembly according to claim 1 wherein the tang is integral with the shaft.

5. An assembly according to claim 1 wherein the tang is integral with the base of the bore.

6. An assembly according to claim 1 wherein the tang is formed separately from the shaft or base and is an interference fit in an aperture formed in the end of the shaft or base of the bore respectively.

7. An assembly according to claim 1 wherein the shaft comprises a groove spaced apart from the end thereof and extending around the shaft circumference.

8. An assembly according to claim 7 wherein the groove has tapered sides.

* * * * *